(12) United States Patent
Noguchi

(10) Patent No.: US 6,190,445 B1
(45) Date of Patent: *Feb. 20, 2001

(54) HIGH-CHROMA ORANGE PEARL PIGMENT

(75) Inventor: Tamio Noguchi, Iwaki (JP)

(73) Assignee: Merck Patent Gesellschaft, Darmstadt (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/181,000
(22) PCT Filed: Mar. 5, 1998
(86) PCT No.: PCT/EP98/01243
§ 371 Date: Nov. 19, 1998
§ 102(e) Date: Nov. 19, 1998
(87) PCT Pub. No.: WO98/41584
PCT Pub. Date: Sep. 24, 1998
(51) Int. Cl.[7] .............................. C09D 11/00; C09C 1/22
(52) U.S. Cl. ................... 106/31.9; 106/417; 106/418; 106/456; 106/459
(58) Field of Search .................. 106/31.9, 417, 106/418, 456, 459

(56) References Cited

U.S. PATENT DOCUMENTS

| | | | | |
|---|---|---|---|---|
| 3,926,659 | * | 12/1975 | Bernhard et al. | 106/418 |
| 4,435,220 | * | 3/1984 | Watanabe et al. | 106/418 |
| 5,106,419 | * | 4/1992 | Hechler et al. | 106/418 |
| 5,354,374 | * | 10/1994 | Prengel | 106/459 |
| 5,522,923 | * | 6/1996 | Kimura et al. | 106/418 |

FOREIGN PATENT DOCUMENTS

| | | |
|---|---|---|
| 077959 | 5/1983 | (EP) . |
| 446689 | 9/1991 | (EP) . |
| 796612 | 9/1997 | (EP) . |

* cited by examiner

Primary Examiner—Helene Klemanski
(74) Attorney, Agent, or Firm—Millen, White, Zelano, & Branigan, P.C.

(57) ABSTRACT

The present invention is directed to the development of a highly safe high-chroma orange pearl pigment replacing a cadmium pigment, in which a flaky substrate has surfaces coated with spherical metal oxide particles containing iron oxide, or spherical metal oxide particles obtained by adding thereto a specific proportion of one or more oxides selected from among aluminum, calcium and magnesium oxides, and a process for manufacturing the same, and uses thereof.

15 Claims, No Drawings

HIGH-CHROMA ORANGE PEARL PIGMENT

This invention relates to a novel high-chroma orange pearl pigment including fine spherical metal oxide particles containing iron oxide coated on the surfaces of a flaky substrate, which pigment is useful as a coloring material not only in the fields of industrial products, such as paints, inks and plastics, but also in other fields, such as cosmetics.

BACKGROUND OF THE INVENTION

A cadmium pigment has been the only known orange colored pigment. The cadmium pigment is the pigment of a solid solution consisting of cadmium sulfide (CdS) as main component, and appropriate proportions of zinc sulfide (ZnS) cadmium selenide and mercury sulfide (HgS). The cadmium pigment has been widely used, since it has been considered as a coloring agent of high clearness for which there is virtually no substitute (Tsunashima, et al.: Latest Applied Pigment Technology, peLge 24, C.M.C. Co., Ltd.). The use of the cadimium pigment has, however, been discontinued almost completely, since it began to be avoided when the cadmium pollution in the environment became a problem.

On the other hand there have been sold, or proposed pigments which comprise a flaky substrate coated with iron oxide, or a metal oxide containing iron oxide, as described below, but no pearl pigment having an orange color has been developed as yet.

The inventor of this invention previously disclosed a transparent color pigment which comprises mica particles coated thereon with iron oxide and/or a hydrate thereof (see Japanese Patent Publication No. Hei 1-60511). This pigment is, however, an orange pigment having a high degree of transparency and a low hiding power, since its observation by a scanning electron microscope reveals that iron oxide is composed of needle crystals having a diameter of as large as 0.1 to 0.2 micron, and causing, therefore, large scattering of reflected light.

The pearl pigments which comprise mica, or like particles coated with iron oxide are made and sold for practical use by Merck as a series of products under the tradename "IRIODIN 500". They are, however, not pearl pigments having an orange color of high chroma. In connection with two series of pigments comprising mica as a flaky substrate with two coated system of titanium oxide and ferric oxide, respectively, as a coating metal oxide, Thurn-Muller, et al. report the values "a" (indicating red on the +side and green on the—side), and "b" (yellow on the +side and blue on the—side) of the Hunter color tone produced by each such pigment, and by varying with the amount of the coating (or its optical thickness) (Kontakte, No. 2, pages 35–43, 1992). It is understood that the most desirable orange color having the highest chroma is obtained when the maximum values of "a" and "b" coincide with each other. According to this literature, the pigments which comprise mica coated with titanium oxide show only interference colors, but as is obvious from the variations of the values "a" and "b", there is no coincidence between the maximum values of "a" and "b" with respect to any interference color, and there does not exist any range in which an interference orange color of high chroma is produced. Studies have also been made of the pigments which comprise mica coated with ferric oxide, and include the measuring result of variations of the each "a" and "b" value of combined interference color with absorption characteristic of ferric oxide (complementary colors to absorption colors). But the colors vary from bronze to copper, and from copper to sienna, and they fail to show any coincidence between the maximum values of "a" and "b", as the pigments in the system of containing titanium oxide.

There has also been proposed a red pigment having an orange to bluish red color which comprises sheet-like iron oxide particles, or sheet-like particles coated with iron oxide and an aluminum compound layer, or an aluminum compound layer containing a composite of iron oxide and alumina, being coated with such a layer having an appropriate optical thickness (see Japanese Patent Laid open No. Hei 6-100794). This pigment has reddish color generated by double layer structure such as combination of reflection (complementary) by the absorption of the iron oxide coated on the sheet-like particles, with interference color due to a second coating structure controlling the thickness of the outer aluminum oxide layer. The combined colors of interference and reflection are claimed to give a reddish color of high chroma having a by far sharper tone than that of the color (of reflection) obtained by a pigment containing only iron oxide. The pigment is also claimed to be able to develop a color of still improved chroma if the outer aluminum oxide layer is replaced by a composite oxide layer of iron and aluminum oxides.

These pigments are, however, produced by a known and commonly used process, i.e. neutralization decomposition, the urea process (uniform precipitation reaction), or thermal hydrolysis, employing iron and aluminum salts as materials for the coating metal compounds, and no pearl pigment having an orange color can be obtained.

Thus, only the cadmium pigment is known as an orange pigment, and there is a demand for the development of a safe and high-chroma orange colored pigment instead of it.

SUMMARY OF THE INVENTION

As a result of the earnest study for developing an orange pearl pigment under these circumstances, the inventor of this invention has succeeded in developing a novel orange pearl pigment of high luster and chroma by coating the surfaces of a flaky substrate with fine spherical metal oxide particles consisting mainly of spherical particles of iron oxide having a size suited for producing a yellowish red color.

Thus, this invention provides a novel high-chroma orange pearl pigment, a process for manufacturing the same and use thereof as set forth at 1) to 6) below.
1) In a pearl pigment including a metal oxide containing iron oxide coated on the surfaces of a flaky substrate, a high-chroma orange pearl pigment characterized in that the metal oxide comprises fine spherical particles containing iron oxide in the amount of 40 to 300 parts by weight in terms of ferric oxide relative to 100 parts by weight of flaky substrate.
2) A high-chroma orange pearl pigment as set forth at 1) above, wherein the metal oxide particles is coated on the flaky substrate in a suspension of the flaky substrate in the presence of a sulfate and/or persulfate and/or polysulfate group.
3) A high-chroma orange pearl pigment as set forth at 1.) or 2) above, wherein the fine spherical metal oxide particles further contain not more than 35% by weight of aluminum oxides in terms of $Al_2O_3$, and/or not more than 2% by weight of calcium oxides in terms of CaO, and/or not more than 2% by weight of magnesium oxides in terms of MgO, relative to iron oxide in the terms of the ferric oxide.
4) A process for manufacturing a high-chroma orange pearl pigment which comprises preparing an aqueous suspension of a flaky substrate, adding a sulfate and/or a persulfate and/or a polysulfate into the suspension, heating the suspension under stirring, dropping a) an aqueous solution of a ferric salt and b) an aqueous alkali solution into the suspension, while maintaining it at a pH of 2 to 5, then adding b) the aqueous alkali solution again into the suspension until a pH of: 8 to 10, separating a product by filtration, washing it, drying it, and calcining it at a temperature not lower than 500° C.

5) A process for manufacturing a high-chroma orange pearl pigment which comprises preparing an aqueous suspension of a flaky substrate, adding a sulfate and/or a persulfate and/or a polysulfate into the suspension, heating the suspension under stirring, dropping a) an aqueous solution prepared from a ferric salt and/or an aluminum salt and/or a magnesium salt and/or a calcium salt, and b) an aqueous alkali solution into the suspension, while maintaining it at a pH of 2 to 5, then adding b) the aqueous alkali solution again into the suspension until a pH of 8 to 10, separating a product by filtration, washing it, drying it, and calcining it at a temperature not lower than 500° C.

6) A paint, ink, plastic, or cosmetic containing a high-chroma orange pearl pigment as set forth at any of 1) to 3) above.

This invention is, for increasing chroma and pearl luster of orange color at visual observation, based on the discovery of the fact that a high-chroma orange pearl pigment can be obtained controlling the size or crystal form of metal oxide particles containing iron oxide coated on the surface of the flaky substrate, and by controlling the coating weight thereof is so controlled as to give an optical thickness suited to within the range in which a reddish interference color is produced (the range between the maximum values of "a" and "b").

The following is a detailed description of the invention.

The flaky substrate which is used for the purpose of this invention is a transparent one, such as mica, synthetic mica, glass flakes or flaky silica, having a particle diameter of 1 to 150 microns and a thickness not exceeding 5 microns, and preferably an average thickness not exceeding 1 micron.

The following is a process for manufacturing an orange pearl pigment of high luster and chroma according to this invention. First of all, a flaky substrate is suspended in water, and its suspension is heated to 60° C. or above. It is heated to a temperature preferably, say, between 70° C. and its boiling point. Although an aqueous solution of an iron salt as will be described later may be added to the suspension to make a pearl pigment coated with iron oxide, it is preferable to add a sulfate and/or a persulfate and/or a polysulfate (hereinafter referred to simply as "sulfate groups"). Any water-soluble salt can be used as the sulfate groups, for example, ammonium sulfate (($NH_4)_2SO_4$), potassium sulfate ($K_2SO_4$), sodium sulfate ($Na_2SO_4$) and potassium aluminum sulfate (potassium alum: $AlK(SO_4)_2$) mentioned as the sulfates, ammonium persulfate (($NH_4)S_2O_8$), potassium persulfate ($K_2S_2O_8$) and sodium persulfate ($Na_2S_2O_8$) as the persulfates, and potassium pyrosulfate ($K_2S_2O_7$) and sodium pyrosulfate ($Na_2S_2O_7$) as the polysulfates. It is important to add the sulfate groups before dropping an iron salt, etc. Although the mechanism of action of the sulfate groups is not clear, it is assumed that the addition thereof increases the ionic strength in the suspension, and that they and the large anions of the sulfate groups take part in the formation step of particles of a hydrated metal oxide during the later process of hydrolysis of an additing metal salt such as iron salt, and contribute to controlling their size. It is used in the amount of 0.005 to 0.1 mol relative to 1 mol of an iron salt which will be dropped later, though other conditions may also have to be considered. The use of less than 0.005 mol is not effective for any satisfactory improvement in the chroma of an orange color as intended. In other words, it is impossible to form hydrated metal oxide particles as a precursor for fine spherical metal oxide particles having a diameter suited for the producing an orange color. The use of more than 0.1 mol is not expected to produce any better result, but is undesirable from the standpoint of efficiency of manufacture, since any excess prolongs the later step of washing for removing any free salt. The smaller in size the flaky substrate, the larger specific surface area it has, and it is, therefore, preferable to use as large an amount of the sulfate groups as possible if it is within the above range.

Then, (a) an aqueous solution of a ferric salt and (b) an aqueous alkali solution which are separately prepared are dropped in appropriate amounts into the suspension, while it is maintained at a pH of 2 to 5. It is possible to obtain a pearl pigment having still better properties if (a) the aqueous solution of a ferric salt is replaced by (c) a mixed aqueous solution prepared by adding one or more metal salts selected from among aluminum, magnesium and calcium salts to an aqueous solution of a ferric salt. An aqueous solution of e.g. sodium or potassium hydroxide, or ammonia is used as (b) the aqueous alkali solution. After their dropping, (b) the aqueous alkali solution is added again to the suspension until a pH of 8 to 10, and a dry calcined obtained by successive filtration, washing and drying is material at a temperature of 500° C. or above to produce a pearl pigment as intended.

As to the ferric salt, it is possible to use any soluble ferric salt, and it is appropriate to use, for example, a chloride, sulfate, or nitrate. It is preferably used in such an amount that the amount of iron oxide in the pigment may be 40 to 300 parts by weight in terms of ferric oxide relative to 100 parts by weight of flaky substrate. Any variation within the range is possible, and depends on the color tone and properties of the flaky substrate. The use of any amount less than 40% by weight is undesirable, since it fails to form any coating thickness capable of producing any interference color, and since it is greatly, directly, affected by the proper color of the flaky substrate because of low hiding power of the coated layer. Any amount over 300% by weight is also undesirable, since there is only produced a interference color which deviates from the desired reddish range. In cases where the flaky substrate has a small particle diameter, it is necessary to increase the amount of the ferric salt, since the substrate has a large specific surface area.

It is possible to make an orange pearl pigment of still higher chroma by employing instead of the ferric salt (c) a mixed aqueous solution prepared from a ferric salt and an aluminum and/or calcium and/or magnesium salt. This is assumed due to the fact that the combination of iron and another metal facilitates the sintering of metal oxide particles containing iron oxide, and the densification of the individual fine particles, resulting in a higher apparent refractive index and thereby a higher reflectivity.

The appropriate amounts in which those metal salts are used for the purpose of this invention are not more than 35% by weight of aluminum oxides in terms of $Al_2O_3$, not more than 2% by weight of calcium oxides in terms of CaO and not more than 2% by weight of magnesium oxides in terms of MgO relative to iron oxide (in terms of ferric oxide). Any excess over these ranges is undesirable, since it adversely affects the hue rather than being effective for the sintering of the individual fine particles. The aluminum, magnesium or calcium oxide, or a composite oxide thereof is also effective for making a pigment powder of improved dispersibility.

As the aluminum, magnesium or calcium salt for the purpose of this invention, it is possible to use any soluble salt of the relevant metal, and it is possible to mention, for example, a soluble metal chloride, sulfate, nitrate, carbonate or acetate.

The manufacturing process of this invention employs a calcining temperature of 500° C. or above which enables the formation of fine spherical metal oxide particles having a diameter of 0.02 to 0.1 micron suited for producing a yellowish red color, and the preferred crystal form, while maintaining the size of hydrated metal oxide particles. The preferred range of the calcining temperature is from 600° C. to 900° C. of the calcining temperature is too low, there are obtained iron oxide particles containing a large proportion of goethite crystals and having a strong yellowish tinge. If the calcining temperature is high, there are obtained iron oxide particles containing a large proportion of hematite crystals and having a strong reddish tinge. If the calcining temperature is too high, the fine spherical metal oxide particles melt together and form particles having an undesirably large diameter, while also causing the cohesion of particles of the flaky substrate, resulting in a powder which is unsatisfactory in dispersibility. Although the crystal forms of the fine spherical metal oxide particles produced in accordance with this invention are not definitely clear, it is assumed that the crystals exist as a mixture of from goethites to hematites which comes from iron oxide, and also include mixtured aluminum, calcium or magnesium oxide, or a composite oxide in case of that the pigment is made by employing a salt of any such metal, too. Therefore, the calcining temperature and the amount of heat to be applied are so selected as to carry out a process of dehydration crystallization which enables the fine spherical hydrated metal oxide particles to retain their size until after drying and calcining and form the crystal form desired for producing of an orange color.

The orange pearl pigment manufactured as described above has a high level of chroma, since as a result of its colorimetric measurement by CIE (values L, a and b), it shows a value L of 55 to 70, a value "a" of 20 to 40 and a value "b" of 35 to 55 in the white background, and a value L of 50 to 65, a value "a" of 10 to 30 and a value "b" of 20 to 35 in the black background. The pigment can be used in paints, plastics, inks or cosmetics.

The invention will now be described in further detail by way of examples, though these examples are not intended for limiting the scope of this invention.

EXAMPLES

Example 1

A suspension was prepared by adding 119 g of mica powder having a particle diameter of 10 to 60 microns to 1.5 liters of water, and after the addition of 4.0 g of potassium sulfate, the suspension was heated to 85° C. under stirring. An aqueous solution prepared by dissolving 154.7 g of ferric chloride in 0.83 liter of water was dropped into the suspension, while an aqueous alkali solution was used to maintain it at a pH of about 3.0. The aqueous alkali solution was thereafter added again to the suspension until a pH of 8.5. Then, a solid product was separated from the suspension by filtration, washed, dried, and calcined at about 880° C. to produce a high-chroma orange pearl pigment as shown in Table 1.

Example 2

A suspension was prepared by adding 119 g of mica powder having a particle diameter of 10 to 60 microns to 1.5 liters of water, and after the addition of 2.0 g of potassium persulfate, the suspension was heated to 85° C. under stirring. An aqueous solution prepared by dissolving 154.7 g of ferric chloride in 0.83 liter of water was dropped into the suspension, while an aqueous alkali solution was used to maintain it at a pH of about 3.0. The aqueous alkali solution was thereafter added again to the suspension until a pH of 8.5. Then, a solid product was separated from the suspension by filtration, washed, dried, and calcined at about 880° C. to produce a high-chroma orange pearl pigment as shown in Table 1.

Example 3

A suspension was prepared by adding 119 g of mica powder having a particle diameter of 10 to 60 microns to 1.16 liters of water, and after the addition of 3.9 g of potassium persulfate, the suspension was heated to 85° C. under stirring. A mixed aqueous solution prepared by dissolving 1 g of magnesium chloride, 1 g of calcium chloride, 19 g of aluminum chloride and 154.7 g of ferric chloride in 0.83 liter of water was dropped into the suspension, while an aqueous alkali solution was used to maintain it at a pH of about 3.0. The aqueous alkali solution was thereafter added again to the suspension until a pH of 8.5. Then, a solid product was separated from the suspension by filtration, washed, dried, and calcined at about 850° C. to produce a high-chroma orange pearl pigment as shown in Table 1.

Example 4

A high-chroma orange pearl pigment as shown in Table 1 was made by using potassium pyrosulfate instead of potassium persulfate and otherwise repeating Example 3.

COMPARATIVE EXAMPLE

Comparative Example 1

A low-chroma reddish orange pearl pigment as shown in Table 1 was obtained by repeating Example 2 without using potassium persulfate.

TABLE 1

| | Amounts of materials used and color tones of pigments obtained (white background) | | | | | | | | | | | |
|---|---|---|---|---|---|---|---|---|---|---|---|---|
| No. | $K_2SO_4$ | $K_2S_2O_8$ | $K_2S_2O_7$ | $MgCl_2$ | $CaCl_2$ | $AlCl_3$ | $FeCl_3$ | L | a | b | c | <H° |
| Example 1 | 3.3 | — | — | — | — | — | 130 | 62.1 | 21.4 | 38.9 | 44.4 | 61.2 |
| Example 2 | — | 1.7 | — | — | — | — | 130 | 57.6 | 30.1 | 39.8 | 49.8 | 52.9 |
| Example 3 | — | 3.3 | — | 0.8 | 0.8 | 16 | 130 | 58.9 | 26.1 | 46.5 | 53.3 | 60.7 |
| Example 4 | — | — | 3.3 | 0.8 | 0.8 | 16 | 130 | 60.1 | 26.7 | 47.8 | 54.8 | 60.9 |
| Comparative | — | — | — | — | — | — | 130 | 61.8 | 18.3 | 29.1 | 34.4 | 58.0 |

TABLE 1-continued

Amounts of materials used and color tones of pigments obtained (white background)

| No. | K₂SO₄ | K₂S₂O₈ | K₂S₂O₇ | MgCl₂ | CaCl₂ | AlCl₃ | FeCl₃ | L | a | b | c | ∠H° |
|---|---|---|---|---|---|---|---|---|---|---|---|---|
| Example 1 #500 | | | | | | | | 69.6 | 16.7 | 31.1 | 35.3 | 61.8 |

Note 1): In Table 1, the amount of each metal salt is shown in grams relative to 100 g of mica.
Note 2): #500 is a pearl pigment comprising mica having a particle diameter of 10 to 60 microns and coated with about 61% by weight of iron oxide in terms of ferric oxide (Iriodin 500, product of Merck).

Method for measurement of color tones (values L, a and b):

A sample was prepared by mixing 1 part of pigment and 9 parts of PVC (having a solid content of 20%), and applied to black and white hiding paper by a bar coater 20, and after drying, its values L, a and b were determined by a color meter CR-200 (product of Minolta). The values a and b were used to calculate the values of C and ∠H° in accordance with equations: C (chroma)=$(a^2+b^2)^{1/2}$ and ∠H° (hue angle)=$\tan^{-1}(b/a)$. The results are shown in Table 1.

The high-chroma orange pearl pigments of this invention produce an orange color having a higher level of chroma than those of the conventional pearl pigments, as shown in Table 1, and can be used in the field of paints for automobiles, or for general industrial purposes, in the field of plastics, as not only for the mere color decoration, but also for cases involving plateout, in the field of laser marking, in the field of inks and in the field of cosmetics to produce a vivid orange color having pearl luster.

APPLICATION EXAMPLES

The following is a description of examples in which the pearl pigments which had been obtained in the Examples above were used in paints, plastics, inks and cosmetics.

(1) Example of use in a paint:
This is an example of use in a top coat paint for automobiles.
{Base paint composition}
<Acrylic-melamine resin>
Acrydic 47-712 (product of Dainippon Ink Co., Ltd.): 70 parts by weight
Super Beccamine G812-60 (product fo Dainippon Ink Co., Ltd.): 30 parts by weight
Toluene: 30 parts by weight
Ethyl acetate: 50 parts by weight
N-butanol: 10 parts by weight
Solvesso #150 (Tonen Chemical): 40 parts by weight A paint was prepared by mixing 100 parts by weight of the above acrylic-melamine resin composition and 20 parts by weight of each of the high-chroma orange pearl pigments as obtained in Examples 1 to 4, and adding a thinner for the acrylic-melamine resin to the mixture to lower its viscosity to a level suitable for spray coating (12 to 15 seconds with Ford Cup No. #4), and was applied by spray coating to form a base coat layer. An uncolored top clear paint of the following composition was applied onto the base coat layer:
{Top clear paint}
Acrydic 44-179: 14 parts by weight
Superbeccamine L117-60: 6 parts by weight
Toluene: 4 parts by weight
Butyl cellosolve: 3 parts by weight After top coating, the paints were exposed to the air at 40° C. for 30 minutes, and heated for curing at 135° C. for 30 minutes.

(2) Example of use in a plastic:
The following is an example of composition in which the pigments were used for coloring a plastic:
Polyethylene resin (pellets): 100 parts by weight
Each of the high-chroma orange pearl pigments as obtained in
Examples 1 to 4:1 part by weight
Zinc stearate: 0.2 part by weight
Liquid paraffin: 0.1 part by weight The pellets containing the above composition were dry blended, and extrusion molded.

(3) Example of use in a printing ink:
The following is an example of an ink composition for gravure printing:
CCST medium (nitrocellulose resin of Toyo Ink Co., Ltd.): 10 parts by weight
Each of the high-chroma orange pearl pigments as obtained in Examplse 1 to 4:8 parts by weight A solvent NC102 (Toyo Ink Co., Ltd.) was added to the ink of the above composition to adjust its viscosity to a level of 20 seconds as measured by Zahn Cup No. 3, and it was used for printing.

(4) Example for use in a cosmetic:
The following is a composition for a lip-coloring cosmetic:
Ozokerite: 5 parts by weight
Ceresine: 5 parts by weight
Paraffin wax: 10 parts by weight
Glycerol trioctanate: 20 parts by weight
Diisostearyl malate: 42 parts by weight
Octyldodecyl myristate: 10 parts by weight
Each of the high-chroma orange pearl pigments as obtained in Examples 1 to 4, and coloring matter: Appropriate amounts Oxidation inhibitor, preservative, and perfume: Small amounts A lipstick was formed from the above composition.

What is claimed is:

1. An orange pearlescent pigment comprising a metal oxide containing iron oxide, coated on a flaky substrate, said metal oxide being fine spherical particles comprising said iron oxide in an amount of 40 to 300 parts by weight in terms of ferric oxide relative to 100 parts by weight of said flaky substrate, prepared by a process in which a sulfate and/or persulfate and/or polysulfate are added to a suspension of the flaky substrate prior to addition of iron salt.

2. The orange pearlescent pigment according to claim 1, wherein ammonium sulfate, potassium sulfate, sodium sulfate, potassium aluminum sulfate, ammonium persulfate or sodium pyrosulfate are added to a suspension of the flaky substrate prior to addition of iron salt.

3. An orange pearlescent pigment comprising a metal oxide containing iron oxide, coated on a flaky substrate, said metal oxide being fine spherical particles comprising said iron oxide in an amount of 40 to 300 parts by weight in terms of ferric oxide relative to 100 parts by weight of said flaky substrate, not more than 35% by weight of aluminum oxides in terms of $Al_2O_3$, and not more than 2% by weight of calcium oxides in terms of CaO, and/or not more than 2% by weight of magnesium oxides in terms of MgO, relative to said iron oxide in terms of ferric oxide.

4. A process for manufacturing an orange pearlescent pigment, comprising preparing an aqueous suspension of a flaky substrate, adding a sulfate and/or a persulfate and/or a polysulfate into said suspension, heating said suspension under stirring, adding a) an aqueous solution of a ferric salt, and b) an aqueous alkali solution into said suspension, while maintaining said suspension at a pH of 2 to 5, then adding aqueous alkali solution into said suspension until reaching a pH of 8 to 10.

5. The process according to claim 4, further comprising separating a product, washing, drying and calcining.

6. The process according to claim 5, where calcining is conducted at no lower than 510° C.

7. A process for manufacturing an orange pearlescent pigment, comprising adding into an aqueous suspension of a flaky substrate and heating said suspension under stirring, a) an aqueous solution of a ferric salt and a magnesium salt and/or a calcium salt, and b) an aqueous alkali solution into said suspension, while maintaining it at a pH of 2 to 5, adding additional aqueous alkali solution into said suspension until achieving a pH of 8 to 10.

8. The process according to claim 7, further comprising separating a product, washing, drying and calcining.

9. The process according to claim 8, where calcining is conducted at no lower than 510° C.

10. A paint, ink, plastic, or cosmetic containing an orange pearlescent pigment according to claim 1.

11. A paint, ink, plastic, or cosmetic containing an orange pearlescent pigment according to claim 2.

12. A paint, ink, plastic, or cosmetic containing an orange pearlescent pigment according to claim 3.

13. An orange pearlescent pigment comprising a metal oxide containing iron oxide, coated on a flaky substrate, said metal oxide being fine spherical particles comprising said iron oxide in an amount of 40 to 300 parts by weight in terms of ferric oxide relative to 100 parts by weight of said flaky substrate, not more than 2% by weight of calcium oxides in terms of CaO, and/or not more than 2% by weight of magnesium oxides in terms of MgO, relative to said iron oxide in terms of ferric oxide.

14. A paint, ink, plastic, or cosmetic containing an orange pearlescent pigment according to claim 13.

15. The pigment according to claim 3, containing calcium and magnesium oxides.

* * * * *